UNITED STATES PATENT OFFICE.

JOHN W. DIXON, OF PHILADELPHIA, PENNSYLVANIA.

IMPROVEMENT IN THE MANUFACTURE OF PAPER-PULP.

Specification forming part of Letters Patent No. 51,813, dated January 2, 1866.

*To all whom it may concern:*

Be it known that I, JOHN W. DIXON, of the city of Philadelphia and State of Pennsylvania, have invented a new and useful Process of Making Paper-Pulp from Wood, Straw, &c.; and I do hereby declare the following to be a full and exact description of the same.

Heretofore it has been proposed to make paper-pulp from wood and straw by subjecting these materials to maceration in heated water under a pressure of sixty to eighty pounds, and thus to soften the gummy matter, and while the material is in this softened condition to subject it to a whipping, grinding, or beating to separate mechanically the fibers.

I have discovered that by submitting wood or straw after being chipped or cut to the merely chemical or dissolving action of highly-heated water under a pressure at or above one hundred and twenty-five pounds per square inch, without any whipping, grinding, or beating, the material will be converted into pulp ready to be bleached at once and made into paper; and my process consists in placing the cut wood or straw and water in the proportion of about forty gallons of water to the one hundred pounds of wood or straw in a closed boiler capable of sustaining a pressure of from two hundred to four hundred pounds to the square inch, and heating it until the pressure of about one hundred and twenty-five to two hundred and fifty pounds is attained. I prefer to use the higher range of temperature, as the operation proceeds with greater rapidity as the temperature is increased, and I would not advise a lower temperature than one hundred and fifty pounds, although I have had fair results at one hundred and twenty-five pounds pressure by continuing the boiling operation for a considerable length of time. After the material has been subjected to the action of highly-heated water, as above, for some time, the water may be changed advantageously, and a reheating takes place at the same temperature in fresh water. The length of time of the operation will depend on the material used and the temperature of the water.

The length of time can easily be determined for any desired temperature to be adapted for a given material by having a draw-off pulp-cock in the side of the boiler, by which the material can be examined from time to time.

Having thus described my invention, I do not desire to claim the mechanical treatment of wood, straw, cane, and other analogous material when subjected to the action of highly-heated water under a pressure of from sixty to eighty pounds in order to separate the fiber, as this has been before proposed; but

What I claim is—

The process of treating wood, straw, cane, and other analogous vegetable substances by highly-heated water under pressure of one hundred and twenty-five pounds and upward, substantially as herein set forth and described.

JOHN W. DIXON.

Witnesses:
T. HATT,
JOHN WHITE.